United States Patent Office 3,532,642
Patented Oct. 6, 1970

3,532,642
CATALYST COMPOSITION AND USE THEREOF
FOR THE POLYMERIZATION OF EPOXIDES
Junji Furukawa, Kyoto-shi, Nariyoshi Kawabata, Osaka-shi, Mikio Nakaniwa and Akihiro Kawasaki, Kyoto-shi, Naomichi Takemura, Ichihara-shi, and Hitoshi Ohashi, Iwao Kameoka, and Tsuneto Nishiyama, Kyoto-shi, Japan, assignors to Maruzen Petrochemical Company, Limited, Minato-ku, Tokyo, Japan, a corporation of Japan
No Drawing. Filed Feb. 2, 1967, Ser. No. 613,400
Claims priority, application Japan, Feb. 4, 1966, 41/6,114; July 12, 1966, 41/45,128
Int. Cl. C08g 23/06
U.S. Cl. 260—2
17 Claims

ABSTRACT OF THE DISCLOSURE

A catalyst composition comprising a reaction product of an organozinc or organoaluminum compound with an azoxy compound, preferably in a molar ratio of 1:0.05–4.0 and a process for the production of polyepoxides by polymerizing at least one epoxide in the presence of said catalyst composition.

---

The present invention relates to a new catalyst composition and the preparation thereof and to a new and improved process of polymerizing epoxides using the said catalyst composition for preparing high molecular weight polyepoxides.

It has already been proposed that various catalyst systems comprising an organometallic compound such as organoaluminum and organozinc compounds in combination with a compound having active hydrogen may be used for the preparation of high molecular weight polyalkylene oxides. Among these catalysts, for instance, there may be exemplified a reaction product of a dialkylzinc with water, a reaction product of a dialkylzinc with a polyol, a chelated organoaluminum compound and a reaction product thereof with water and a reaction product of a dialkylzinc with methyl vinyl ketone or acetone. The active species of these catalysts may be considered to be a reaction product of a dialkylzinc or a trialkyl-aluminum with an electron donor containing active hydrogen. However, these catalyst systems tend to become heterogenous and to lower or lose their catalytic activities during the polymerization in which they are used. Further, they only give relatively low molecular weight polymers of alkylene oxides. For example, in the polymerization of propylene oxide, most of these catalysts result in polypropeylene oxides having intrinsic viscosities of less than 10 except the case where a dialkylzincmethyl vinyl ketone system is used as catalyst.

According to the present invention, we provide a new catalyst composition suitable for the polymerization of epoxides comprising a reaction product of an organometallic compound selected from the group consisting of organozinc and organoaluminum compounds with an azoxy compound.

Further, according to the present invention, we provide a process for the polymerization of epoxides which comprises polymerizing at least one epoxide in the presence of a catalyst comprising a reaction product of an organo metallic compound selected from the group consisting of organozinc and organoaluminum compounds with an azoxy compound.

The new catalyst composition according to the present invention is in a homogeneous state and has further advantages that the catalytic activity thereof is rather high at elevated temperatures and does not lower even after subjecting said catalyst to a high temperature treatment for a long period.

According to the present invention, by the use of the new catalyst composition the polymerization reaction may be conducted very smoothly and polyepoxides having much higher molecular weights than those obtained by known processes may be obtained.

Typical examples of usable azoxy compounds include symmetrical azoxybenzenes represented by the following Formula I, asymmetrical azoxybenzenes represented by the following Formulae II and III and aralkylazoxybenzenes represented by the following Formula IV:

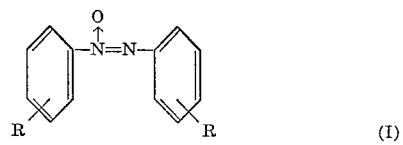
(I)

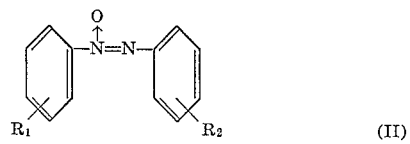
(II)

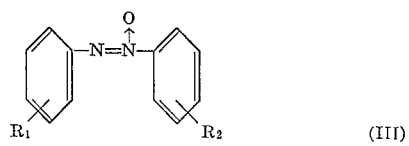
(III)

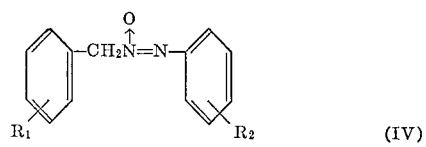
(IV)

where R, $R_1$ and $R_2$ each represent hydrogen atom, alkyl, alkoxy or halogen atom.

Symmetrical azoxy compounds represented by the Formula I may be cis- or trans-form and include as typical examples azoxybenzene (cis, trans, R=H), dichloro azoxybenzene (2:2'; cis, trans; 3:3', cis, trans; 4:4', cis, trans; R=Cl), azoxytoluene (2:2', cis, trans; 3:3' cis, trans, 4:4', cis, trans; R=CH₃), azoxyanisol (2:2', cis, trans; 4:4', cis, trans, R=OC₂H₅) and disubstituted azoxybenzenes such as 3:3':4:4'-tetramethoxy azoxybenzene.

Asymmetrical azoxybenzenes, α- and β-forms corresponding to the Formulae II and III, include as typical examples 4-bromo-azoxybenzene (α-form: $R_1$=H, $R_2$=Br; β-form: $R_1$=Br, $R_2$=H), 4-methyl-azoxybenzene (α-form: $R_1$=H, $R_2$=CH₃; β-form: $R_1$=CH₃, $R_2$=H), 4-ethoxy-azoxybenzene (α-form: $R_1$=H, $R_2$=OC₂H₅; β-form: $R_1$=OC₂H₅, $R_2$=H), 4-fluoro-azoxybenzene (β-form: $R_1$=F, $R_2$=H) and asymmetrically poly-substituted azoxybenzenes such as 4:4'-bis-azoxybenzenes (α-, β- and γ-forms). Typical examples of the aralkyl azoxybenzenes of the Formula IV include those in which $R_1$ is H and $R_2$ is 3-CH₃, 4-CH₃, 4-OCH₃, 3-Cl, and those in which $R_2$ is H and $R_1$ is 3-CH₃, 4-CH₃, 3-OCH₃, 4-OCH₃, 3-Cl, or 4-Br.

Fused-ring aromatic azoxy compounds may also be used and typical examples thereof include 1:1'-azoxynaphthalene, 2:2'-azoxynaphthalene, 9:9'-azoxynaphthalene, 1:2'-azoxynaphthalene (β), 1-phenylazoxynaphthalene (β), 2-phenyl-azoxynaphthalene and 9:9'-azoxyphenanthrene.

Aliphatic azoxy compounds may also be used and typical examples thereof include azoxyalkanes such as azoxymethane, 1-azoxypropane, 2-azoxypropane, 2-azoxy-2:5-dimethylhexane.

Organometallic compounds to be used for preparing the catalyst composition of the present invention may be any of organozinc and organoaluminum compounds which can be reacted with the azoxy compounds. Typical organozinc compounds include dialkylzinc such as dimethylzinc, diethylzinc, di-n-propylzinc, diisopropylzinc and di-n-butylzinc and diarylzinc such as diphenylzinc. Typical organoaluminum compounds include those represented by the general formula $AlR_nX_{3-n}$ where R represents alkyl group such as methyl ethyl, propyl and butyl, X represents hydrogen atom, halogen atom such as Cl, Br and F or alkoxy group such as methoxy and ethoxy and $n$ represents an integer of 2 to 3, for example trialkylaluminum, dialkylaluminum halide, dialkylaluminum alkoxide, and the like.

The activity of the catalyst composition of the present invention prepared by the reaction of an organometallic compound with an azoxy compound may vary with the changes of kinds and proportions of the catalyst components and the reaction temperatures. It is preferred, in general, for the preparation of catalyst composition to use the azoxy compound in an amount of about 0.05–4.0 moles per mole of the organometallic compound.

The preparation of catalyst composition, that is, the reaction of organometallic compounds with azoxy compounds, may be carried out in the absence of a diluent, but the presence of a diluent for the azoxy compounds is preferred to conduct the reaction smoothly and to obtain a homogeneous catalyst system. Any diluent which is inert under the reaction conditions may be used. The use as inert diluent of aliphatic hydrocarbons such as butane, pentane, hexane, heptane, octane etc., aromatic hydrocarbons such as benzene, toluene, xylene Tetralin etc., cycloaliphatic hydrocarbons such as cyclohexane, Decalin etc., aliphatic or cycloaliphatic ethers such as ethylether, butylether, dioxane, tetrahydrofuran, 1,2-dimethoxyethane etc. may be preferred. The preparation of catalyst composition may be carried out in the presence of epoxy compound to be polymerized. The temperature for the preparation of catalyst composition may vary within a wide range. Since, however, the reaction between the organometallic and azoxy compounds is relatively violent and exothermic with the generation of gases, it is desirable to add a diluted solution of organometallic compound in an appropriate solvent to a diluted solution of azoxy compound in the same solvent at a temperature of from −78° C. to room temperature. In particular, the addition of a solution of organometallic compound to a solution of azoxy compound cooled to −78° C. is most suitable to obtain a completely homogeneous catalyst system. The catalyst composition in solution thus obtained may be used as it is in the polymerization of epoxides. If, however, such a freshly prepared catalyst composition is insufficient in its activity, it is particularly preferred to subject the catalyst composition to heat treatment to enhance the activity thereof to the maximum. The temperature for said heat treatment may vary within a wide range, but it is usually sufficient to carry out the treatment at a temperature ranging from 70° C. to 150° C., preferably 70 to 100° C. for ten minutes to four hours to achieve a desired result. It should be noted as surprising characteristics of the present invention over the prior art that the catalyst composition thus prepared is in the form of a completely homogeneous and stable solution and nevertheless has a significantly high activity for the polymerization of epoxides and has no tendency to lower the activity for a month at room temperatures.

The catalyst-forming reaction which involves a violent reaction with the generation of gases is believed to be a chemical reaction by which a chemical bond is formed between the organometallic compound and azoxy group, not but a mere coordination therebetween. The reaction involved may be considered as addition reaction, complex-forming reaction and subsequent substitution reaction, the degree of respective reaction varying with the reaction conditions.

Any epoxide may be homopolymerized or copolymerized with a second epoxy compound by the process of the present invention with improved results. Typical examples of epoxides which may be homo-polymerized or copolymerized are ethylene oxide; mono- and disubstituted ethylene oxides

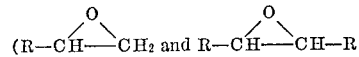

where R stands for a hydrocarbon radical such as alkyl, aryl, cycloalkyl etc.), for instance alkylene oxides such as propylene oxide, 1-butene oxide, isobutylene oxide etc. and substituted alkylene oxides such as cyclohexene oxide, styrene oxide, phenyl glycidyl ether, bisphenol glycidyl ether etc.; halogen-containing epoxides, for instance epichlorohydrin, epifluorohydrin, trifluoroethylene oxide, perfluoropropylene oxide etc.; unsaturated epoxides, for instance allyl glycidyl ether, vinyl glycidyl ether, vinylcyclohexene mono- or di-oxide etc.

The polymerization reaction may be carried out by any desired means, either as a batch or a continuous process with the catalyst added all at one time or intermittently during the polymerization or continuously throughout the polymerization. If necessary, the monomer or monomers may be added gradually to the polymerization system. The polymerization may be carried out without diluent, but it is usually preferable to use an inert diluent which is conveniently the same one as used in the preparation of catalyst composition. The temperature and pressure conditions for the polymerization according to the present invention may vary within wide ranges. Usually, the polymerization may be carried out at a temperature from −70° C. to 200° C. preferably from 0° C. to 100° C. and under autogenous pressure. If desired, a subatmospheric or a superatmospheric pressure may also be used.

The following examples will further illustrate the preparation of catalyst composition and the process for polymerizing various epoxides in accordance with the present invention in which all parts and percentages are by weight.

EXAMPLE 1

Into a 40 cc. glass polymerization tube filled with nitrogen was charged 1.0 cc. of an azoxybenzene solution which was previously prepared under nitrogen atmosphere by dissolving 9.9114 g. (0.05 mole) of azoxybenzene into toluene to obtain the total volume of 50 cc. The solution was cooled to −78° C. and 1.0 cc. of a diethylzince solution which was prepared by dissolving 5.1 cc. (0.05 mole) of diethylzince into toluene to obtain the total volume of 50 cc. was added thereto. On the addition of diethylzince solution, the yellow colour of azoxybenzene solution was not substantially changed. The polymerization tube was heated in an oil bath at 100° C. for about 30 minutes under a moisture free condition. During the heating, the colour of contents of the tube was changed from yellow into dark red. After the completion of heating, the reaction mixture was allowed to stand until it was cooled to room temperature, where the reaction mixture was quite homogeneous.

The catalyst thus obtained has the molar ratio of azoxybenzene to diethylzince of 1:1. To this catalyst solution was added, under nitrogen atmosphere, 18.0 cc. of toluene and the mixture was cooled to −78° C. Then 4.9 cc. (0.1 mole) of ethylene oxide was added to the catalyst system thus obtained and the tube was sealed and maintained in a polymerization bath at 73° C. for 2 hours. At the end of this period, the tube was opened and the polymer thus formed was poured into a large amount of ether to precipitate the polymer. After a small amount of methanol was added to destroy the catalyst, the precipitated polymer was isolated by the filtration followed by washing with 0.5% HCl solution in ether-methanol (80:20) mixture and washing with ether three times. The polymer thus isolated was a hard, white solid.

The polymer thus obtained weighed 2.6088 g. the conversion was 58.4% and the intrinsic viscosity at 30° C. of acetonitrile solution thereof was 11.1.

EXAMPLE 2

The same procedure as described in Example 1 was repeated except that the amount of azoxybenzene and the addition amount of toluene were varied as shown in Table 1. The yield of polymer, conversion rate and intrinsic viscosity at 30° C. of acetonitrile solution of the polymer in each experiment are also shown in Table 1.

TABLE 1

| Amount of ethylene oxide, mole | Amount of azoxybenzene cc. | Azoxybenzene/diethylzinc, mole | Amount of toluene, cc. | Yield of polymer g. | Conversion, percent | Intrinsic viscosity, dl./g. |
|---|---|---|---|---|---|---|
| 0.1 | 0.25 | 0.25 | 18.8 | 1.4340 | 42.0 | 8.4 |
| 0.1 | 0.50 | 0.50 | 18.5 | 1.8378 | 41.1 | 9.7 |
| 0.1 | 0.75 | 0.75 | 18.3 | 2.2482 | 50.2 | 11.5 |
| 0.1 | 1.00 | 1.0 | 18.0 | 2.6088 | 58.3 | 13.2 |
| 0.1 | 1.25 | 1.25 | 17.8 | 2.3018 | 45.3 | 12.8 |
| 0.1 | 1.50 | 1.50 | 17.5 | 1.6493 | 36.8 | 12.4 |
| 0.1 | 1.75 | 1.75 | 17.3 | 1.7624 | 39.3 | 12.0 |
| 0.1 | 2.0 | 2.0 | 17.0 | 1.4765 | 32.9 | 11.5 |
| 0.1 | 2.5 | 2.5 | 16.5 | 1.3551 | 30.2 | 10.6 |

EXAMPLE 3

The same procedure as described in Example 1 was repeated except that after the diethylzinc solution was added to the azoxybenzene solution at −78° C. the catalyst composition thus prepared was immediately used for the polymerization, without treating it in an oil bath at 100° C. by adding thereto toluene and ethylene oxide and the polymerization was carried out for 24 hours. The polymer thus obtained weighed 0.3011 g. and the conversion was 6.7%.

EXAMPLES 4–7

In these examples, the same procedure as described in Example 1 was repeated except that the polymerization conditions were varied as shown in Table 2, in which the results thus obtained are also shown.

TABLE 2

| Example No.: | Amount of ethylene oxide, mole | Amount of azoxybenzene, cc. | Amount of diethylzinc, cc. | Azoxybenzene/diethylzinc, mole | Amount of toluene, cc. | Polymerization temperature, °C. | Polymerization time, hr. | Yield of polymer, g. | Conversion, percent | Intrinsic viscosity, dl./g. |
|---|---|---|---|---|---|---|---|---|---|---|
| 4 | 0.1 | 0.10 | 0.25 | 0.40 | 19.7 | 73.0 | 24.0 | 3.4386 | 76.6 | 44.4 |
| 5 | 0.1 | 0.10 | 0.10 | 1.0 | 19.8 | 73.0 | 24.0 | 3.4505 | 77.1 | 16.9 |
| 6 | 0.1 | 0.10 | 0.10 | 1.0 | 19.8 | 30.0 | 262 | 0.6658 | 14.9 | 41.5 |
| 7 | 0.1 | 0.25 | 0.30 | 0.13 | 19.5 | 73.0 | 24.0 | 3.3360 | 74.4 | 9.9 |

EXAMPLES 8–16

These examples demonstrate the polymerization of ethylene oxide using the same procedure as in Example 1 except that various azoxy compounds are used in place of azoxybenzene. The results obtained are shown in Table 3.

TABLE 3

| Ex. No. | Azoxy compound | Amount of ethylene oxide, mole | Amount of azoxy compound/toluene, g./cc. | Amount of diethylzinc, cc. | Molar ratio of azoxy compound/diethylzinc | Amount of toluene, cc. | Polymerization temperature, °C. | Polymerization time, hr. | Yield of polymer, g. | Conversion, percent | Intrinsic viscosity, dl./g. |
|---|---|---|---|---|---|---|---|---|---|---|---|
| 8 | 2:2′-dichloro-azoxybenzene | 0.1 | 0.2759/1.0 | 1.0 | 1.0 | 18.0 | 73.0 | 12.3 | 4.4809 | 99.8 | 7.0 |
| 9 | 3:3′-dichloro-azoxybenzene | 0.1 | 0.2663/2.0 | 1.0 | 1.0 | 17.0 | 73.0 | 15.5 | 4.0841 | 91.1 | 7.4 |
| 10 | 4:4′-dichloro-azoxybenzene | 0.1 | 0.2705/2.0 | 1.0 | 1.0 | 17.0 | 73.0 | 15.5 | 4.5355 | 100.9 | 10.1 |
| 11 | 2:2′-azoxy-anisol | 0.1 | 0.2862/1.0 | 1.0 | 1.0 | 18.0 | 73.0 | 24.0 | 1.6442 | 36.6 | 3.7 |
| 12 | 4:4′-azoxy-anisol | 0.1 | 0.2898/1.0 | 1.0 | 1.0 | 18.0 | 73.0 | 24.0 | 4.5340 | 100.9 | 10.5 |
| 13 | 2:2′-azoxy-toluene | 0.1 | 0.2256/1.0 | 1.0 | 1.0 | 17.0 | 73.0 | 15.5 | 0.6540 | 14.6 | 1.1 |
| 14 | 4-fluoro-azoxybenzene | 0.1 | 0.2077/1.0 | 1.0 | 0.96 | 18.0 | 73.0 | 15.5 | 3.4560 | 77.2 | 27.1 |
| 15 | Benzyl-azoxybenzene | 0.1 | 0.1994/1.0 | 1.0 | 0.94 | 18.0 | 73.0 | 24.0 | 3.8612 | 86.0 | 20.0 |
| 16 | β-Azoxynaphthalene | 0.1 | 0.075/0.25 | 0.25 | 0.95 | 19.5 | 73.0 | 24.0 | 0.3276 | 7.3 | 5.5 |

EXAMPLE 20

The same procedure as described in Example 1 was repeated except that n-hexane was used as solvent in place of toluene. In this case, the catalyst system is homogenous as in Example 1, but with the proceeding of the polymerization the formed polyethylene oxide precipitated as fine particles. The yield, conversion and intrinsic viscosity in acetonitrile at 30° C. of the polyethylene oxide thus obtained were 3.23 g., 71.9% and 20.0, respectively.

EXAMPLES 21–22

In these examples, diethylzinc used in Example 1 was replaced by triethylaluminum as a toluene solution prepared by dissolving 6.855 cc. (0.05 mole) of triethylaluminum into toluene to obtain the total volume of 50 cc. and the amount of triethylaluminum to ethylene oxide and the amount of azoxybenzene to triethylaluminum were varied as shown in Table 4. All other conditions used were the same as those in Example 1. The polymers thus obtained were hard, white solids. The results obtained are also shown in Table 4.

TABLE 4

| | Amount of ethylene oxide, mole | Amount of azoxy-benzene, cc. | Amount of triethyl-aluminum, cc. | Molar ratio of azoxy-benzene/triethyl-aluminum | Amount of toluene, cc. | Polymerization temperature, °C. | Polymerization time, hr. | Yield of polymer, g. | Conversion, percent | Intrinsic viscosity, dl./g. |
|---|---|---|---|---|---|---|---|---|---|---|
| Example No.: | | | | | | | | | | |
| 21 | 0.1 | 1.2 | 0.3 | 4.0 | 18.5 | 73.0 | 24.5 | 1.0933 | 24.4 | 11.8 |
| 22 | 0.1 | 4.0 | 1.0 | 4.0 | 15.0 | 73.0 | 24.5 | 3.0198 | 67.3 | 14.2 |

EXAMPLE 23

This example demonstrates the polymerization of propylene oxide using azoxybenzene-diethylzinc system catalyst compositions in various proportions. The procedures used for the preparation of catalyst and for the polymerization in each experiment were the same as those described in Example 1.

In each case, after the polymerization period indicated a sufficient amount of benzene was added to the polymerization reaction mixture to give a low viscosity solution easy to handle and a small amount of methanol was then added to destroy the catalyst. The mixture was centrifuged to remove solid matters therefrom and the liquid portion was freeze-dried. The polymer thus obtained in each experiment was a slightly yellowish white rubbery elastomer. The results are shown in Table 5, in which the intrinsic viscosity of each polymer is of benzene solution at 25° C.

TABLE 5

| Amount of propylene oxide, mole | Amount of azoxy-benzene, c.c. | Amount of diethyl-zinc, c.c. | Molar ratio of azoxy-benzene/diethyl-zinc, c.c. | Amount of toluene, c.c. | Polymerization temperature, °C. | Polymerization time hr. | Yield of polymer, g. | Conversion, percent | Intrinsic viscosity, dl./g. |
|---|---|---|---|---|---|---|---|---|---|
| 0.1 | 0.25 | 1.0 | 0.25 | 18.8 | 73.0 | 15.5 | 1.0316 | 18.6 | 15.9 |
| 0.1 | 0.25 | 1.0 | 0.50 | 18.5 | 73.0 | 15.5 | 3.7748 | 68.0 | 15.7 |
| 0.1 | 1.0 | 1.0 | 1.0 | 18.0 | 73.0 | 15.5 | 4.9625 | 85.5 | 11.9 |
| 0.1 | 1.5 | 1.0 | 1.5 | 17.5 | 73.0 | 15.5 | 3.5675 | 61.5 | 12.2 |
| 0.1 | 2.6 | 1.0 | 2.6 | 16.5 | 73.0 | 15.5 | 4.1825 | 72.0 | 12.8 |

EXAMPLES 24–30

These examples demonstrate the polymerization of propylene oxide using the same procedure as in Example 23 except that various azoxy compounds are used in place of azoxybenzene. The results are shown in Table 6.

TABLE 6

| Example No. | Azoxy compound | Amount of propylene oxide, mole | Amount of azoxy compound/toluene, g./cc. | Amount of diethyl-zinc, cc. | Molar ratio of azoxy compound/diethyl zinc | Amount of toluene, cc. | Polymerization temperature, °C. | Polymerization time, hr. | Yield of polymer, g. | Conversion, percent | Intrinsic viscosity, dl./g. |
|---|---|---|---|---|---|---|---|---|---|---|---|
| 24 | 2:2'-dichloro-azoxybenzene | 0.1 | 0.2664/1.0 | 1.0 | 1.0 | 18.0 | 73.0 | 24.0 | 5.4380 | 98.0 | 9.9 |
| 25 | 3:3'-dichloro-azoxybenzene | 0.1 | 0.2640/2.0 | 1.0 | 1.0 | 17.0 | 73.0 | 24.0 | 3.9201 | 70.6 | 5.8 |
| 26 | 4:4'-dichloro-azoxybenzene | 0.1 | 0.2661/2.0 | 1.0 | 1.0 | 18.0 | 73.0 | 24.0 | 5.1603 | 93.0 | 9.3 |
| 27 | 4:4'-azoxy-anisol | 0.1 | 0.07/1.0 | 0.25 | 0.25 | 18.8 | 73.0 | 41.6 | 2.1421 | 38.6 | 10.3 |
| 28 | 2:2'-azoxy-anisol | 0.1 | 0.07/1.0 | 0.25 | 0.25 | 18.8 | 73.0 | 48.0 | 1.2057 | 21.7 | 5.0 |
| 29 | 2:2'-azoxy-toluene | 0.1 | 0.2353/1.0 | 1.0 | 1.0 | 18.0 | 73.0 | 24.0 | 0.8285 | 14.9 | 5.5 |
| 30 | 4-fluoro-azoxybenzene | 0.1 | 0.2149/1.0 | 1.0 | 1.0 | 18.0 | 73.0 | 24.0 | 3.6899 | 64.7 | 4.4 |

EXAMPLE 31

This example demonstrates the polymerization of propylene oxide using the same procedure as in Example 23 except that triethylaluminum is used in place of diethylzinc. The polymers thus obtained were rubbery elastomers. The results are shown in Table 7.

TABLE 7

| Amount of propylene oxide, mole | Amount of azoxy-benzene, c.c. | Amount of triethyl-aluminum, c.c. | Amount of toluene, c.c. | Molar ratio of azoxy-benzene/triethyl-aluminum | Polymerization temperature, °C. | Polymerization time, hr. | Yield of polymer, g. | Conversion, percent | Intrinsic viscosity, dl./g. |
|---|---|---|---|---|---|---|---|---|---|
| 0.1 | 0.50 | 1.0 | 18.5 | 0.5 | 73.0 | 63.0 | 2.1179 | 38.1 | 4.4 |
| 0.1 | 1.0 | 1.0 | 18.0 | 1.0 | 73.0 | 63.0 | 3.2938 | 59.4 | 4.5 |
| 0.1 | 1.5 | 1.0 | 17.5 | 1.5 | 73.0 | 63.0 | 3.5129 | 63.3 | 4.9 |
| 0.1 | 2.5 | 1.0 | 16.5 | 2.5 | 73.0 | 63.0 | 3.6052 | 64.9 | 4.4 |
| 0.1 | 4.0 | 1.0 | 15.0 | 4.0 | 73.0 | 63.0 | 4.1864 | 75.5 | 4.0 |

EXAMPLE 32

This example demonstrates the polymerization of epichlorhydrin using an azoxybenzene-triethylaluminum-system catalyst composition.

The preparation of catalyst composition and the polymerization procedure followed those described in Example 21 except that the amount of triethylaluminum was 1.0 cc., the molar ratio of azoxybenzene to triethylaluminum was 2.0, the amount of toluene was 17.0 cc., the amount of epichlorhydrin was 7.8 cc. (0.1 mole) and the polymerization was conducted at 73° C. for 48.0 hours. At the end of this period, the polymerization reaction mixture was diluted with a large excess of ether and allowed to stand to separate layers. The ether-insoluble portion separated was purified by steeping in 1% HCl solution in ethanol followed by washing with methanol. The polymer thus obtained was hard, white rubbery elastomer. The total conversion rate was 17.9% and the ether-insoluble portion was 91.0% with respect to the total conversion rate. The reduced viscosity of the ether-insoluble polymer as 0.1% α-chloronaphthalene solution at 100° C. was 3.1.

EXAMPLE 33

This example demonstrates the copolymerization of ethylene oxide and propylene oxide using a diethyl-zinc-azoxybenzene system catalyst composition. The catalyst composition was prepared in accordance with the procedure described in Example 1. The polymerization was carried out by using a monomer mixture comprising 5.02 g. of ethylene oxide and 4.98 g. of propylene oxide in the presence of the catalyst composition in which the content of diethylzinc was 0.25 cc. (equal to the content thereof in Example 1 and corresponding to 0.128% by mole with respect to the total monomers) and in which the molar ratio of azoxybenzene to diethylzinc was 1.0, with the addition of 19.5 cc. of toluene, at 73° C. for 24 hours. At the end of this period, the polymerization reaction mixture was dissolved in 1500 cc. of acetone containing 2% of water, the mixture was centrifuged to remove insoluble matter completely therefrom and then dried to the constant weight. The copolymer thus isolated weighed 4.38 g. the yield thereof being 43.8% with respect to the total weight of monomers. It was found that the copolymer contained 24% of propylene oxide by infrared analysis. The intrinsic viscosity of the copolymer as chloroform solution at 25° C. was 11.2.

EXAMPLE 34

Into a 40 cc. glass polymerization tube filled with nitrogen, was charged 1.0 cc. of an azoxybenzene solution which was previously prepared under nitrogen atmosphere by dissolving 9.9114 g. (0.05 mole) of azoxybenzene into toluene to obtain the total volume of 100 cc. The solution was cooled to −78° C. and 0.5 cc. of a diethylzinc solution which was prepared by dissolving 5.1 cc. (0.05 mole) of diethylzinc into toluene to obtain the total volume of 50 cc. was added thereto. On the addition of diethylzinc solution, yellow colour of azoxybenzene solution was not substantially changed. The glass tube was then heated in an oil bath at 100° C. for 2 hours in such a manner that only a portion of the tube filled with the solution is steeped in the oil bath leaving the major portion of said tube in air to prevent the entrainment of toluene with the gases generated during the heating. During the heating, the colour of contents of the tube was changed from yellow into dark red. After the completion of heating, the reaction mixture was allowed to stand until it was cooled to room temperature, where the reaction mixture was quite homogeneous.

The catalyst composition thus obtained has the molar ratio of azoxybenzene to diethylzinc of 0.5:1. To this catalyst solution was added, under nitrogen atmosphere, 8.5 cc. of toluene. Then, 6.0 cc. (0.05 mole) of allylglycidyl ether was added to the catalyst composition thus obtained and the tube was sealed and maintained at 70° C. for 64.5 hours, during which the mixture gradually became viscous and finally solidified. Polyallyglycidyl ether of 0.42 g. (conversion rate: 7.4%) was obtained as adhesive solid, a portion (0.28 g.) of which being ether-soluble and methanol-soluble and the remaining portion being ether-insoluble and acetone-insoluble. The reduced viscosity of the ether-soluble portion as 0.1% solution of cyclohexanone at 50° C. was 0.9.

EXAMPLE 35

The same procedure as described in Example 34 was repeated except that in the preparation of catalyst composition 0.5 cc. of triethylaluminum solution in toluene which was prepared by dissolving 6.85 cc. (0.05 mole) of triethylaluminum into toluene to obtain the total volume of 50 cc. was used in place of diethylzinc.

Polyallylglycidyl ether in the form of adhesive elastomer thus obtained weighed 0.80 g. (conversion rate: 13.8%), a portion (0.54 g.) of which being ether-soluble and methanol-soluble and the remaining portion being ether-insoluble and acetone-insoluble. The reduced viscosity of the ether-soluble portion as 0.1% solution of cyclohexanone at 50° C. was 1.8.

EXAMPLES 36–47

These examples demonstrate the copolymerization of various epoxides using the general procedure as in Example 34 and using various catalyst compositions, solvents, temperature and time conditions as shown in Table 8, in which the results obtained are also shown. In Table 8, the monomeric epoxides and the catalyst components used are shown by the following symbols:

EOX=ethylene oxide
POX=propylene oxide
ECH=epichlorhydrin
AGE=allylglycidyl ether
Z=diethylzinc
A=triethylaluminum
Azo=azoxybenzene In Examples 36, 37, 43 and 44, the copolymers of propylene oxide and allylglycidyl ether or of propylene oxide and epichlorhydrin formed were isolated by adding a sufficient amount of ether to the polymerization reaction mixture to give a low viscosity solution easy to handle, separating the soluble portion from the insoluble portion after allowed to stand for several days and removing the ether from the soluble portion. Thus, Examples 36 and 37 gave rubbery elastomers, Examples 43 gave an adhesive, rubbery elastomer and Example 44 gave an adhesive solid.

In Examples 38, 39, 40, 41 and 42, the copolymers of ethylene oxide and allylglycidyl ether or of ethylene oxide and epichlorhydrin were isolated by adding a ten-times by volume of n-hexane to the polymerization reaction mixture to precipitate the copolymers. Thus, Example 38 gave a paste, Example 39 gave a solid having no substantial tensile strength, Example 40 gave a paste and Examples 41 and 42 gave rubbery elastomers.

In Examples 45, 46 and 47, the copolymers of propylene oxide and ethylene oxide were isolated by adding a sufficient amount of acetone containing 2% of water to the polymerization reaction mixture to give a low viscosity solution easy to handle, separating by centrifuge the soluble portion from the insoluble portion after allowed to stand for several days and removing the solvent from the soluble portion. Thus, Examples 45–47 gave rubbery elastomers.

TABLE 8

| Example No. | Monomers Names | Monomers Total moles | Monomers Molar ratio | Amount of toluene, c.c. | Catalyst composition Components | Catalyst composition Proportion of Z or A to monomers, percent | Azo/Z Azo/A |
|---|---|---|---|---|---|---|---|
| 36 | PO, AGE | 0.05 | 4:1 | 8.5 | Z-Azo | 1.0 | 1.0 |
| 37 | PO, AGE | 0.05 | 4:1 | 8.5 | A-Azo | 1.0 | 1.0 |
| 38 | EO, AGE | 0.05 | 4:1 | 8.5 | Z-Azo | 1.0 | 1.0 |
| 39 | EO, AGE | 0.05 | 4:1 | 8.5 | A-Azo | 1.0 | 1.0 |
| 40 | EO, ECH | 0.05 | 4:1 | 8.5 | Z-Azo | 1.0 | 1.0 |
| 41 | EO, ECH | 0.05 | 4:1 | 8.5 | A-Azo | 1.0 | 1.0 |
| 42 | EO, ECH | 0.05 | 1:4 | 8.5 | A-Azo | 1.0 | 1.0 |
| 43 | PO, ECH | 0.05 | 4:1 | 8.5 | Z-Azo | 1.0 | 1.0 |
| 44 | PO, ECH | 0.05 | 4:1 | 8.5 | A-Azo | 1.0 | 1.0 |
| 45 | PO, EO | 0.05 | 4:1 | 8.5 | Z-Azo | 1.0 | 1.0 |
| 46 | PO, EO | 0.05 | 1:4 | 8.5 | Z-Azo | 1.0 | 1.0 |
| 47 | PO, EO | 0.05 | 1:1 | 8.5 | A-Azo | 1.0 | 1.0 |

| Example No. | Polymerization conditions | Total polymers Yield, g. | Total polymers Conversion, percent | Copolymers Yield, g. | Copolymers Conversion, percent | Reduced viscosity |
|---|---|---|---|---|---|---|
| 36 | 70° C., 77.0 hr | 0.40 | 11.6 | 0.32 | 9.2 | ² 0.7 |
| 37 | 70° C., 65.5 hr | 0.82 | 23.5 | 0.66 | 19.0 | ² 2.4 |
| 38 | 70° C., 74.0 hr | 2.27 | 78.1 | 2.27 | 78.1 | ² 6.6 |
| 39 | 70° C., 67.0 hr | 1.41 | 48.7 | 1.30 | 44.8 | ² 0.7 |
| 40 | 70° C., 46.5 hr | 0.63 | 23.3 | 0.47 | 17.2 | ¹ 9.0 |
| 41 | do | 0.76 | 28.4 | 0.28 | 10.4 | ¹ 2.2 |
| 42 | do | 0.54 | 13.0 | 0.54 | 13.0 | ¹ 12.9 |
| 43 | 70° C., 66.0 hr | 0.28 | 8.5 | 0.28 | 8.5 | ² 0.5 |
| 44 | do | 0.80 | 24.7 | 0.80 | 24.7 | ² 5.3 |
| 45 | 70° C., 68.0 hr | 2.76 | 100 | 2.53 | 91.6 | ¹ 3.0 |
| 46 | 70° C., 67.0 hr | 2.3 | 100 | 1.18 | 50.5 | ¹ 11.2 |
| 47 | do | 1.0 | 39.1 | 0.53 | 20.9 | ¹ 7.5 |

¹ Reduced viscosity determined in respect of 0.1% solution in chloroform at 25° C.
² Reduced viscosity determined in respect of 0.1% solution in benzene at 25° C.

What we claim is:

1. A process for the polymerization of 1,2-epoxides which comprises polymerizing at least one 1,2-epoxide in the presence as catalyst of a reaction product of an organometallic compound selected from the group consisting of organozinc compounds having the formula $ZnR_2$ where R is an alkyl or phenyl group and organoaluminum compounds having the formula $AlR_nX_{3-n}$ where R is an alkyl group, X is a hydrogen, halogen or an alkoxy group and $n$ is 2 or 3, with an azoxy compound selected from the group consisting of symmetrical azoxybenzenes having the formula:

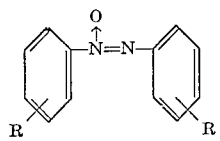

where R represents hydrogen, halogen, alkyl or alkoxy; asymmetrical azoxybenzenes having the formulas:

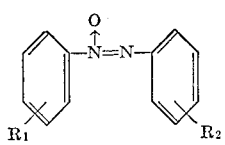

and

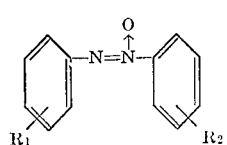

where $R_1$ and $R_2$ are different from each other and each represents hydrogen, halogen, alkyl or alkoxy; aralkylazoxybenzenes having the formula:

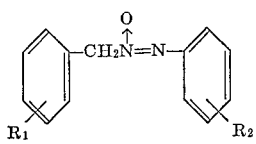

where $R_1$ and $R_2$ have the meaning defined above; azoxynaphthalenes; phenyl-azoxynaphthalenes; azoxyphenanthrenes and azoxyalkanes.

2. A process as claimed in claim 1 wherein the catalyst forming reaction between the organometallic compound and azoxy compound is carried out prior to contact with the epoxide to be polymerized.

3. A process as claimed in claim 1 wherein the catalyst-forming reaction between the organometallic compound and azoxy compound is carried out in situ in the presence of epoxide to be polymerized.

4. A process as claimed in claim 1 wherein the catalyst-forming reaction between the organometallic compound and azoxy compound is carried out in the presence of an inert diluent.

5. A process as claimed in claim 4 wherein the inert diluent is selected from the group consisting of aliphatic, aromatic and cycloaliphatic hydrocarbons and aliphatic and cycloaliphatic ethers.

6. A process as claimed in claim 1 wherein the catalyst is subjected to a heat-treatment prior to the use for the polymerization.

7. A process as claimed in claim 6 wherein the heat treatment is carried out at a temperature of from 70° C. to 150° C. for a time from 10 minutes to 4 hours.

8. A process as claimed in claim 1 wherein the polymerization is carried out in the presence of an inert diluent.

9. A process as claimed in claim 8 wherein the inert diluent is selected from the group consisting of aliphatic, aromatic and cycloaliphatic hydrocarbons and aliphatic and cycloaliphatic ethers.

10. A process as claimed in claim 1 wherein the catalyst is a reaction product of diethylzinc and azoxybenzene.

11. A process as claimed in claim 1 wherein the catalyst is a reaction product of triethylaluminum and azoxybenzene.

12. A process as claimed in claim 1 wherein the 1,2-epoxide to be polymerized is ethylene oxide.

13. A process as claimed in claim 1 wherein the 1,2-epoxide to be polymerized is propylene oxide.

14. A process as claimed in claim 1 wherein the 1,2-epoxide to be polymerized is allylglycidyl ether.

15. A process as claimed in claim 1 wherein ethylene oxide is copolymerized with epichlorhydrin.

16. A process as claimed in claim 1 wherein propylene oxide is copolymerized with allyglycidyl ether.

17. A process as claimed in claim 3 wherein ethylene oxide is copolymerized with propylene oxide.

References Cited
UNITED STATES PATENTS

| | | | |
|---|---|---|---|
| 3,135,706 | 6/1964 | Vandenberg | 260—2 |
| 3,301,796 | 1/1967 | Herold | 260—2 |

WILLIAM H. SHORT, Primary Examiner

E. A. NIELSEN, Assistant Examiner

U.S. Cl. X.R.

260—47, 88.3, 143, 429.9, 448, 615